(12) United States Patent
Gailloux et al.

(10) Patent No.: US 9,215,572 B1
(45) Date of Patent: Dec. 15, 2015

(54) MOBILE DEVICE ALTERNATIVE TEXT MESSAGING

(75) Inventors: Michael A. Gailloux, Overland Park, KS (US); Kenneth W. Samson, Belton, MO (US)

(73) Assignee: Sprint Communications Company L.P., Overland Park, KS (US)

(*) Notice: Subject to any disclaimer, the term of this patent is extended or adjusted under 35 U.S.C. 154(b) by 1166 days.

(21) Appl. No.: 12/565,092

(22) Filed: Sep. 23, 2009

(51) Int. Cl.
H04W 4/12 (2009.01)
H04W 4/14 (2009.01)

(52) U.S. Cl.
CPC ..................... H04W 4/14 (2013.01)

(58) Field of Classification Search
CPC ..................... H04W 4/14
USPC ..................... 455/466
See application file for complete search history.

(56) References Cited

U.S. PATENT DOCUMENTS

| | | | | |
|---|---|---|---|---|
| 5,983,095 | A * | 11/1999 | Cameron | 455/417 |
| 7,054,660 | B2 * | 5/2006 | Lord | 455/558 |
| 7,924,811 | B2 * | 4/2011 | Asokan | 370/352 |
| 2002/0090964 | A1 * | 7/2002 | Harder | 455/466 |
| 2002/0198007 | A1 * | 12/2002 | Zimmerman | 455/458 |
| 2006/0079260 | A1 | 4/2006 | Tillet et al. | |
| 2007/0105531 | A1 * | 5/2007 | Schroeder, Jr. | 455/411 |
| 2007/0249325 | A1 * | 10/2007 | Blight et al. | 455/412.1 |
| 2007/0293250 | A1 * | 12/2007 | Kim | 455/466 |
| 2009/0034707 | A1 * | 2/2009 | Li | 379/207.02 |
| 2009/0088198 | A1 * | 4/2009 | Cheng | 455/551 |
| 2009/0106770 | A1 * | 4/2009 | Gan et al. | 719/313 |
| 2009/0286508 | A1 * | 11/2009 | Cai et al. | 455/407 |
| 2010/0022260 | A1 * | 1/2010 | Chang | 455/466 |
| 2010/0058211 | A1 * | 3/2010 | Lee et al. | 715/764 |
| 2011/0026468 | A1 * | 2/2011 | Conrad et al. | 370/329 |
| 2011/0028128 | A1 * | 2/2011 | Cazanas et al. | 455/414.1 |
| 2011/0306330 | A1 * | 12/2011 | Sharp et al. | 455/417 |

* cited by examiner

*Primary Examiner* — Vladimir Magloire
*Assistant Examiner* — Frank Donado

(57) ABSTRACT

A system is provided for mobile device alternative text messaging. The system includes a processor, a memory, and a messaging component stored in the memory. When executed by the processor, the messaging component receives a first text message sent by a first originator device via a first mobile directory number associated with a mobile device, sends a second text message to the first originator device via the first mobile directory number, receives a third text message sent by a second originator device via a second mobile directory number associated with the mobile device, and sends a fourth text message to the second originator device via the second mobile directory number. The messaging component may delete the association between the second mobile directory number and the mobile device, associate a third mobile directory number with the mobile device, receive a fifth text message sent by a third originator device via the third mobile directory number associated with the mobile device, and send a sixth text message to the third originator device via the third mobile directory number.

19 Claims, 5 Drawing Sheets

MOBILE DEVICE ALTERNATIVE TEXT MESSAGING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

A mobile device may be a mobile phone, a wireless communication device, a pager, a personal digital assistant (PDA), a portable computer, a tablet computer, a laptop computer, a digital camera, a digital music player, a digital calculator, an electronic key fob for keyless entry, a media player, or an inventory control device. A mobile device user may use a mobile device for text messaging or texting, which is the common term for the sending of "short" (originally 160 characters or fewer, including spaces) text messages from mobile devices. The individual messages which are sent are called text messages or, more colloquially, texts. The most common application of text messaging is person-to-person messaging, but text messages are also often used to interact with automated systems, such as ordering products and services for mobile devices, or participating in contests.

SUMMARY OF THE INVENTION

In some embodiments, a system is provided for mobile device alternative text messaging. The system includes a processor on a mobile device, a memory, and a messaging component stored in the memory. When executed by the processor, the messaging component receives a first text message sent by a first originator device via a first mobile directory number associated with the mobile device, sends a second text message to the first originator device via the first mobile directory number, receives a third text message sent by a second originator device via a second mobile directory number associated with the mobile device, and sends a fourth text message to the second originator device via the second mobile directory number.

In some embodiments, a method is provided for mobile device alternative text messaging. A messaging component stored in a memory and executed by a processor receives a first text message via a first mobile directory number associated with a mobile device, sends a second text message via the first mobile directory number, receives a third text message via a second mobile directory number associated with the mobile device, and sends a fourth text message via the second mobile directory number.

In some embodiments, a system is provided for mobile device alternative text messaging. The system includes a processor on a mobile device, a memory, and a messaging component stored in the memory. When executed by the processor, the messaging component receives a first text message via a first mobile directory number associated with the mobile device, sends a second text message via the first mobile directory number, receives a third text message via a second mobile directory number associated with the mobile device, and sends a fourth text message via the second mobile directory number. The messaging component deletes the association between the second mobile directory number and the mobile device, associates a third mobile directory number with the mobile device, receives a fifth text message via the third mobile directory number, and sends a sixth text message via the third mobile directory number.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
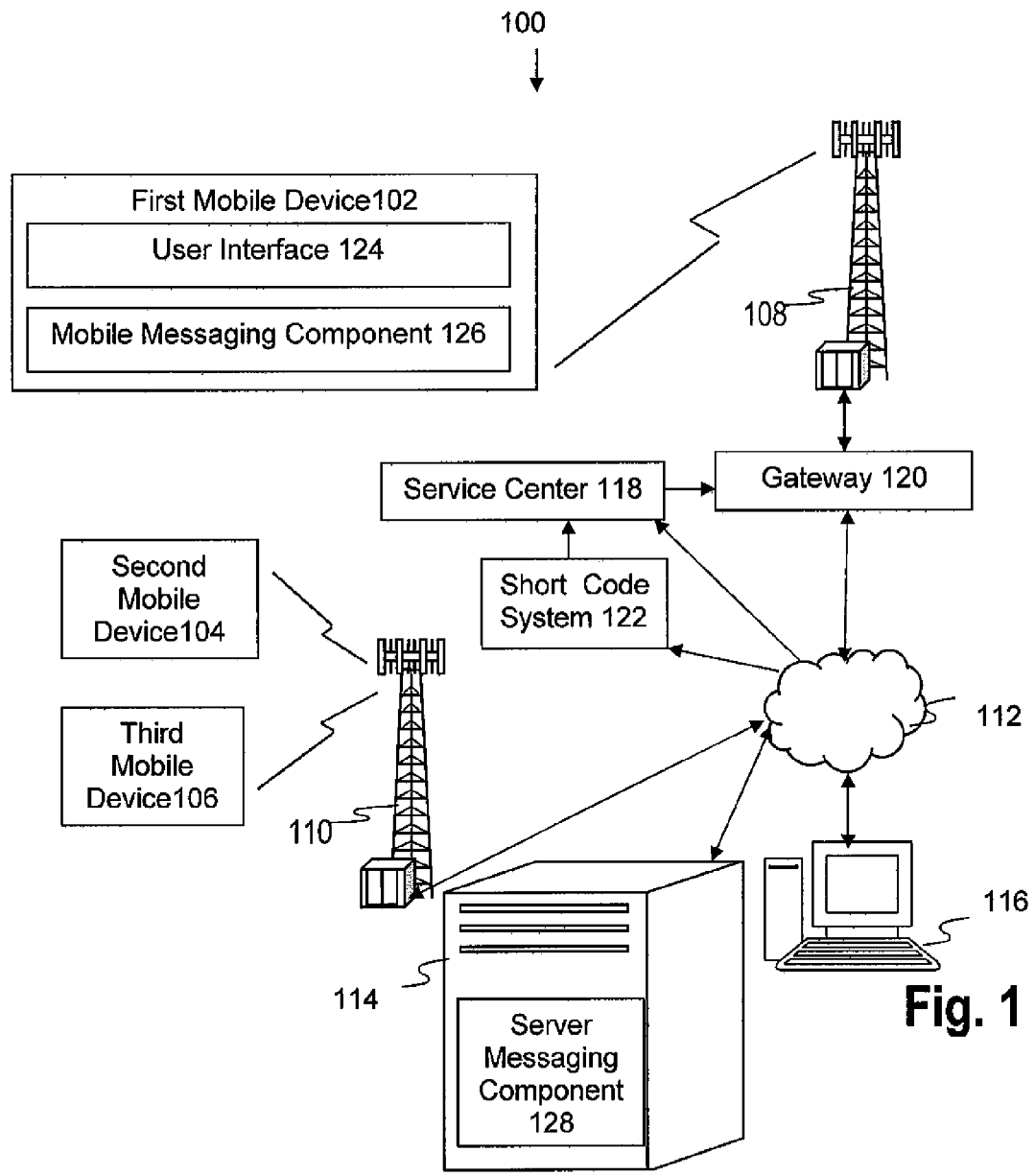
FIG. 1 is a block diagram of a system for mobile device alternative text messaging according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Although a mobile device user may share their own phone number, for example a mobile directory number (MDN), with some other mobile device users for texting purposes, the user may be hesitant to share this mobile device number with all of the other users who request this number. For example, an office worker may want to provide their mobile directory number to a salesman for a specific occasion, to be informed by text message immediately when a much-needed shipment arrives, but the office worker may not want the salesman to have the worker's mobile directory number afterwards due to concerns about receiving an excessive amount of sales text messages or sales voice calls. Additionally, the office worker may be concerned about the salesman giving their mobile directory number away to other businesses and/or selling their mobile directory number to a telemarketing database. In another example, an unmarried woman may want to share her mobile directory number with an unmarried man so that he can subsequently invite her to dinner via text messages, but she may be hesitant to share her mobile directory number with him in case she decides after the dinner that she is not interested in him any more, and is concerned that he may continue to text her.

Embodiments of the present disclosure provide systems and methods for mobile device alternative text messaging. A messaging component receives a first text message sent to a first mobile directory number associated with a mobile device and sends a second text message using the first mobile directory number. For example, a woman's supervisor sends a text message about a meeting to the woman's primary mobile phone number, and she uses her mobile phone to respond to the supervisor's text message using the primary mobile phone number. The messaging component receives a third text message sent to a second mobile directory number associated with the mobile device, and sends a fourth text message using the second mobile directory number. For example, a man that the woman met at the party sends a text message about a dinner invitation to the woman's auxiliary mobile phone number, and she uses her mobile phone to respond to his text message using the auxiliary mobile phone number. Whereas the primary mobile phone number may be listed in a telephone directory with the woman's name, the auxiliary mobile phone number may be anonymous, such that the man that she met at the party may not be able to determine her identity from her auxiliary mobile phone number. Additionally, while the primary mobile phone number may be used to complete a voice call to the woman's mobile phone, in an embodiment, the auxiliary mobile phone number can not be used to complete a voice call to the woman's mobile phone, because the wireless service provider associated with the woman's mobile phone does not route a voice call to the auxiliary mobile phone number. Note, however, that a voice call originated to the auxiliary mobile phone number in a network outside of the network of the wireless service provider associated with the woman's mobile phone may route to the wireless service provider's network, because the auxiliary mobile phone number is an actual phone number; this voice call, nevertheless, will not be completed by connecting to the woman's mobile phone. Because her primary mobile phone number and her auxiliary mobile phone number have the same format and share the same overall appearance, the man perceives her auxiliary mobile phone number to be her primary mobile phone number when the woman gives her auxiliary mobile phone number to him. The man, similar to other mobile device users, may become uncooperative if he believes that she gave him anonymous contact information that cannot be readily traced back to her. In another example, if the woman wants to participate in text message discussions about politics, and is concerned that her supervisor may disapprove of her political views, the woman may user her anonymous auxiliary mobile phone number for the political text messages.

The messaging component may delete the association between the second mobile directory number and the mobile device, and associate a third mobile directory number with the mobile device. For example, if the woman decides after the dinner that she is not interested in the man any more, and he continues to send text messages to her auxiliary mobile phone number, she may cancel her current auxiliary mobile phone number and select a new auxiliary mobile phone number that she has not shared with the man. The woman may avoid receiving future text messages from the man without having to change her mobile phone or change her primary mobile phone number, which her supervisor may continue to use to communicate with her via text messages. The messaging component may receive a fifth text message sent to the third mobile directory number associated with the mobile device, and send a sixth text message using the third mobile directory number. For example, the woman may use her new auxiliary mobile phone number to continue to participate in political discussions anonymously. Embodiments of the present disclosure offer mobile device users the option to freely share their auxiliary mobile directory number with other mobile device users in a manner that creates the desired level of trust, but with reduced concerns about receiving excessive or unwanted text messages.

In an embodiment, both the primary and auxiliary mobile device numbers may be managed by a wireless communication service provider. In an embodiment of the present disclosure, text messages addressed to the primary mobile device number as well as text messages addressed to the auxiliary mobile device number route over the public switched telephone network (PSTN) relying on simple message service (SMS) and/or multimedia message service (MMS) protocols and do not go off the telephony based network into an instant messaging (IM) network solution or into an electronic mail (email) network solution. In an embodiment, the user may retrieve texts addressed to the auxiliary mobile device number by dialing into a box associated with the auxiliary mobile device number or by activating a selection key, for example a shortcut icon and/or button, on an interface of the user's mobile electronic device. Alternatively, the wireless communication service provider may forward texts addressed to the auxiliary mobile device number to the user's mobile electronic device, thereby associating both the primary mobile device number and the auxiliary device number to the same mobile electronic device.

The auxiliary mobile device number is an actual mobile phone number and not a mere alias. When the user releases the auxiliary mobile device number, the wireless communication service provider, which may have registered the mobile device number, may reallocate the mobile device number as the primary mobile device number of a different mobile electronic device for use in completing voice calls as well as other communication activities. Additionally, text messages to the auxiliary mobile device number will route across the boundaries of different wireless communication service provider networks and/or the boundaries of different telecommunication service provider networks. To further clarify and distinguish, in an embodiment, a single mobile device having a single device identifier, as contrasted with a single device having two different subscriber identity module (SIM) chips installed concurrently or successively over time, receives text messages addressed to two or more different actual mobile phone numbers, for example the primary mobile phone number and the auxiliary mobile phone number, and replies from the two or more different actual mobile phone numbers. For example, in an embodiment, a single mobile device having a first subscriber identity module (SIM) chip (one and only one SIM chip) installed may receive text messages addressed to two or more different actual mobile phone numbers, for example the primary mobile phone number and the auxiliary mobile phone number, and replies from the two or more different actual mobile phone numbers.

FIG. 1 shows a block diagram of a system 100 for mobile device alternative text messaging according to some embodiments of the present disclosure. The system 100 includes a first mobile device 102, a second mobile device 104, a third mobile device 106, a first base transceiver station (BTS) 108, a second base transceiver station 110, a network 112, and a communication server 114. The mobile devices 102-106 may communicate with each other and with the communication server 114 via the base transceiver stations 108-110 and the network 112. The first mobile device 102 may be referred to as the woman's mobile device 102 or her mobile device 102, the second mobile device 104 may be referred to as the supervisor's mobile device 104, and the third mobile device 106 may be referred to as the man's mobile device 106 or his mobile device 106. The communication server 114 may be implemented on a computer, such as the computer discussed below in reference to FIG. 6.

The system 100 also includes a computer 116, a service center 118, a gateway 120, and a short code system 122. The computer 116 may be used to access a text message receiver, such as a text message mailbox or folder, to view text messages received by the first mobile device 102 and/or compose text messages that may appear to be composed by the first mobile device 102. The computer 116 may also be used to add and delete associations between the mobile devices 102-106 and auxiliary mobile directory numbers.

The service center 118 is a network component, such as a communication server that functions as a short message service center, which receives messages, such as short message service (SMS) messages and/or multimedia messaging service (MMS) messages, from an originator device and forwards the messages to the recipient when the recipient is available. SMS is typically a transport architecture for sending text messages, such as messages of 160 characters or less. MMS is a telecommunications standard for sending messages which include multimedia objects, such as images, audio, video, and rich text. A popular use of MMS is sending photographs from camera-equipped mobile devices, although it is also popular as a method of delivering ring-tones as well. Although the SMS and the MMS telecommunication protocols are discussed in the pending disclosure, they are examples of suitable message systems within a network environment and examples of other suitable message systems are known. The pending disclosure should not be interpreted as having any dependency or requirement relating to any one or combination of particular telecommunication protocols described herein. In some embodiments, the service center 118 stores the messages until the recipient is available.

The gateway 120 provides a boundary between radio communication functions embodied in one or more radio systems for the access-facing portion of the system 100 and the standard internet protocol (IP) communication functions, including mobile IP, embodied in the public network-facing portion of the system, such as the network 112. The gateway 120 may connect the first mobile devices 102 with any online service that is able to connect with the gateway 120, such as instant message (IM) services, the world wide web, desktop computers, and landline telephones (through speech synthesis). Other devices that connect to the mobile devices 102-106 through protocols such as BLUETOOTH may use the same type of link to communicate text messages over a wireless network. The gateway 120 may be a push proxy gateway, a packet data serving node or home agent, an autonomous system number gateway, a server general packet radio service support node, a gateway general packet radio service support node, or other type of gateway, which may be implemented by a communication server.

The short code system 122 may be a network component managed by a third party that routes all text messages sent via short codes for a region, such as for North America. Short codes, also known as short numbers, are special telephone numbers, shorter than full telephone numbers, which can also be used to address SMS and MMS messages from the mobile devices 102-106 or fixed communication devices. Short codes are designed to be shorter to read out and easier to remember than normal telephone numbers. While similar to telephone numbers, they are, at the technological level, unique to each operator, although providers may have agreements to avoid overlaps. Short codes are widely used for value-added services such as television voting, ordering ringtones, charity donations and mobile services. Messages sent to short codes may be billed at a higher rate than a standard SMS. The short code system 122 provides text messages that originate from short codes to the service center 118 via a different port than the port used by the service center 118 to receive all other text messages.

The first mobile device 102 includes a first user interface 124 and a mobile messaging component 126. The communication server 114 may execute a server messaging component 128, and the first mobile device 102 may execute the mobile messaging component 126. Although some examples may describe the server messaging component 128 taking an action, and other examples may describe the mobile messaging component 126 taking other actions, in different embodiments, each action in the present disclosure may be taken by the server messaging component 128, the mobile messaging component 126, or any combination of the messaging components 126-128. The server messaging component 128 may route text messages between the mobile devices 102-106. The server messaging component 128 may not have to display received text messages or compose text messages on the mobile devices 102-106. The mobile messaging component 126 may execute some local actions, such as displaying received text messages and composing text messages, which alleviate the requirement for the server messaging component 128 to monitor numerous distributed mobile devices 102-106.

FIG. 1 depicts the system elements 102-128 for the purpose of an example, as the system 100 may include any number and type of the system elements 102-128. Some details and/or elements of the system 100 are not shown or described so as to not crowd FIG. 1 with details.

The mobile messaging component 126 may receive a first text message sent by a first originator device via a first mobile directory number associated with the first mobile device 102 and send a second text message to the first originator device via the first mobile directory number. For example, a woman's supervisor sends a text message about a meeting to the woman's primary mobile directory number, and she uses her mobile device 102 to respond to the supervisor's text message using the primary mobile directory number. The woman's text message response indicates to the supervisor that her response originated from the woman's primary mobile directory number. The first mobile directory number may comprise a ten digit number, such as 817-698-4199. Text messages may be received from and/or sent to a short code service, which may respond to the woman's auxiliary mobile directory number the same way that the short code service responds to the woman's primary mobile directory number. For example, a short code service provides the latest football news to the mobile devices 102-106 in response to receiving the text message "football" sent by the mobile device 102-106 to the short code 72404. Text messages may be received and/or sent via a short message service (SMS) message and/or a multimedia messaging service (MMS).

The mobile messaging component 126 may add an amount associated with a second mobile directory number to an invoice associated with the first mobile device 102 or request prepayment for the amount associated with the second mobile directory number. The second mobile directory number may comprise a ten digit number, such as 866-805-9890. For example, a communication service provider may add a monthly charge for use of her auxiliary mobile directory number to the monthly invoice for the woman's mobile device 102. The communication service provider may charge the woman for her auxiliary mobile directory number because the set of numbers that the communication service provider has reserved that can serve as a mobile directory number is a limited resource. In another example, the mobile messaging component 126 requests prepayment for the amount associated with her auxiliary mobile directory number because use of the woman's mobile device 102 is based on a prepaid billing plan.

The mobile messaging component 126 may receive a third text message sent by a second originator device via a second mobile directory number associated with the first mobile device 102, and send a fourth text message to the second originator device via the second mobile directory number. For example, a man that the woman met at the party sends a text message about a dinner invitation to the woman's auxiliary mobile directory number, and she uses her mobile device 102 to respond to his text message using the auxiliary mobile directory number. In this example, the server messaging component 128 receives the man's text message that is sent to the woman's auxiliary mobile directory number and directs the man's text message to the woman's mobile device 102. The woman's mobile device 102 may receive text messages sent to her primary mobile directory number and her auxiliary mobile directory number via the same communication channel, which may be associated with the woman's primary mobile directory number. When the woman responds to text messages sent to her primary mobile directory number and her auxiliary mobile directory number, each response may include an originator identifier that the server messaging component 128 uses to indicate the mobile directory number that originated each specific response. For example, when the woman responds to the man's text message, the woman's text message response indicates to the man that her response originated from the woman's auxiliary mobile directory number. Alternatively, the woman's mobile device 102 may receive text messages sent to her primary mobile directory number and her auxiliary mobile directory number via one communication channel associated with the woman's primary mobile directory number and another communication channel associated with the woman's auxiliary mobile directory number.

Whereas the woman's primary mobile directory number may be listed in a telephone directory with the woman's name, the auxiliary mobile directory number may be anonymous, such that the man that she met at the party may not be able to determine her identity from her auxiliary mobile directory number. However, because her primary mobile directory number and her auxiliary mobile directory number have the same format and share the same overall appearance, the man may perceive her auxiliary mobile directory number to be her primary mobile directory number when the woman gives her auxiliary mobile directory number to him.

Even if the woman's mobile device 102 may not receive voice calls sent to her auxiliary mobile directory number, she may be able to persuade other potential text message users to send her text messages instead of calling her auxiliary mobile directory number by claiming that her voice minutes are limited by her calling plan. In another example, if the woman wants to participate in text message discussions about politics, and is concerned that her supervisor may disapprove of her political views, the woman may use yet another auxiliary mobile directory number for the political text messages. The number of auxiliary mobile directory numbers that a mobile device user uses may be limited only by the needs of the user and how much the user is willing to pay for each auxiliary mobile directory number.

The mobile messaging component 126 may delete the association between the second mobile directory number and the first mobile device 102, and associate a third mobile directory number with the first mobile device 102. For example, if the woman decides after the dinner that she is not interested in the man any more, and he continues to send text messages to her auxiliary mobile directory number, she may cancel her current auxiliary mobile directory number and select a new auxiliary mobile directory number that she has not shared with the man. The woman may avoid receiving future text messages from the man without having to change her mobile device 102 or change her primary mobile directory number, which her supervisor may continue to use to communicate with her via text messages. The mobile messaging component 126 may delete the association between the second mobile directory number and the first mobile device 102 based on an identification of the third text message as a spam text message. For example, the woman may indicate that the vast majority of the text messages sent to her auxiliary mobile directory number over the last three months are either spam or unwanted text messages. This identification may trigger the mobile messaging component 126 to prompt her with the option to delete her current auxiliary mobile directory number and request a new auxiliary mobile directory number.

The mobile messaging component 126 may receive a fifth text message sent to the third mobile directory number associated with the first mobile device 102, and send a sixth text message using the third mobile directory number. For example, the woman may use her new auxiliary mobile directory number to continue to participate in political discussions anonymously.

The mobile messaging component 126 may display the first text message and/or the third text message via the user interface 124. For example, the mobile messaging component 126 displays the supervisor's text message and the man's text message on the user interface 124. The user interface 124 may display the first text message and/or the third text message via one text message receiver or two text message receivers, which may be accessed via requests to short code services. For example, the user interface 124 displays the supervisor's text message via a text message mailbox or folder for her primary mobile directory number and displays man's text message via a text message mailbox or folder for her auxiliary mobile directory number.

The single text message receiver may display the first mobile directory number associated with the first text message and/or the second mobile directory number associated with the third text message. For example, if the user interface 124 displays the supervisor's text message and the man's text message via the same text message mailbox or folder, the text messages may indicate whether they were sent to her primary mobile directory number or sent to her auxiliary mobile directory number. One example of such an indication includes displaying her primary mobile directory number in the "to" field for the supervisor's text message and displaying her auxiliary mobile directory number in the "to" field for the man's text message. The mobile messaging component 126 may use such an indication to enable response text messages to indicate that they were sent from the appropriate mobile directory number. For example, when the woman responds to the supervisor's text message, the mobile messaging component 126 uses the woman's primary mobile directory number in the "to" field for the supervisor's text message to generate a response text message that indicates to the supervisor that the response text message is sent using the woman's primary mobile directory number.

The second text message may comprise a response to the first text message, the fourth text message may comprise a response to the third text message, and/or the sixth text message may comprise a response to the fifth text message. The mobile messaging component 126 relates associated text messages in a text message mailbox or folder, such that the user interface 124 displays the associated text messages together to indicate the sequence of associated text messages. For example, the woman's response to her supervisor may include the supervisor's text message as text attached to the woman's response.

The mobile messaging component 126 may determine whether the first mobile device 102 is subscribed to a push-to-talk communication service. If the mobile messaging component 126 determines that the first mobile device 102 is subscribed to a push-to-talk communication service, the mobile messaging component 126 may send text messages via a push-to-talk network. A text message sent via a push-to-talk network may be less expensive for a communication service provider than a text message sent via a voice network. Reasons for the reduced expenses of text messages sent via push-to-talk networks may include the significant loads that text messages may place on voice networks and the relative under-utilization of push-to-talk networks.

The first mobile device 102 may provide push-to-talk communication via one technology network and communicate voice calls via a different technology network. For example, the push-to-talk communication may be via an integrated digital enhanced network (IDEN) communication technology or a code division multiple access (CDMA) technology. Voice calls may be communicated via a code division multiple access (CDMA) technology, a global system for mobile communication (GSM) technology, a universal mobile telecommunications system (UMTS) technology, a long-term evolution (LTE) technology, or a worldwide interoperability for microwave access (WiMAX) technology. Additionally, the mobile messaging component 126 may provide the text message request as a short message service (SMS) message via a wireless paging channel. Therefore, a communication service provider may realize additional savings if the mobile messaging component 126 sends the text message request via an under-utilized DEN network or a wireless paging channel instead of via a heavily loaded CDMA network. Embodiments of the present disclosure offer mobile device users the option to freely share their auxiliary mobile directory number with other mobile device users in a manner that creates the desired level of trust, but with reduced concerns about receiving excessive or unwanted text messages.

Figure 2:
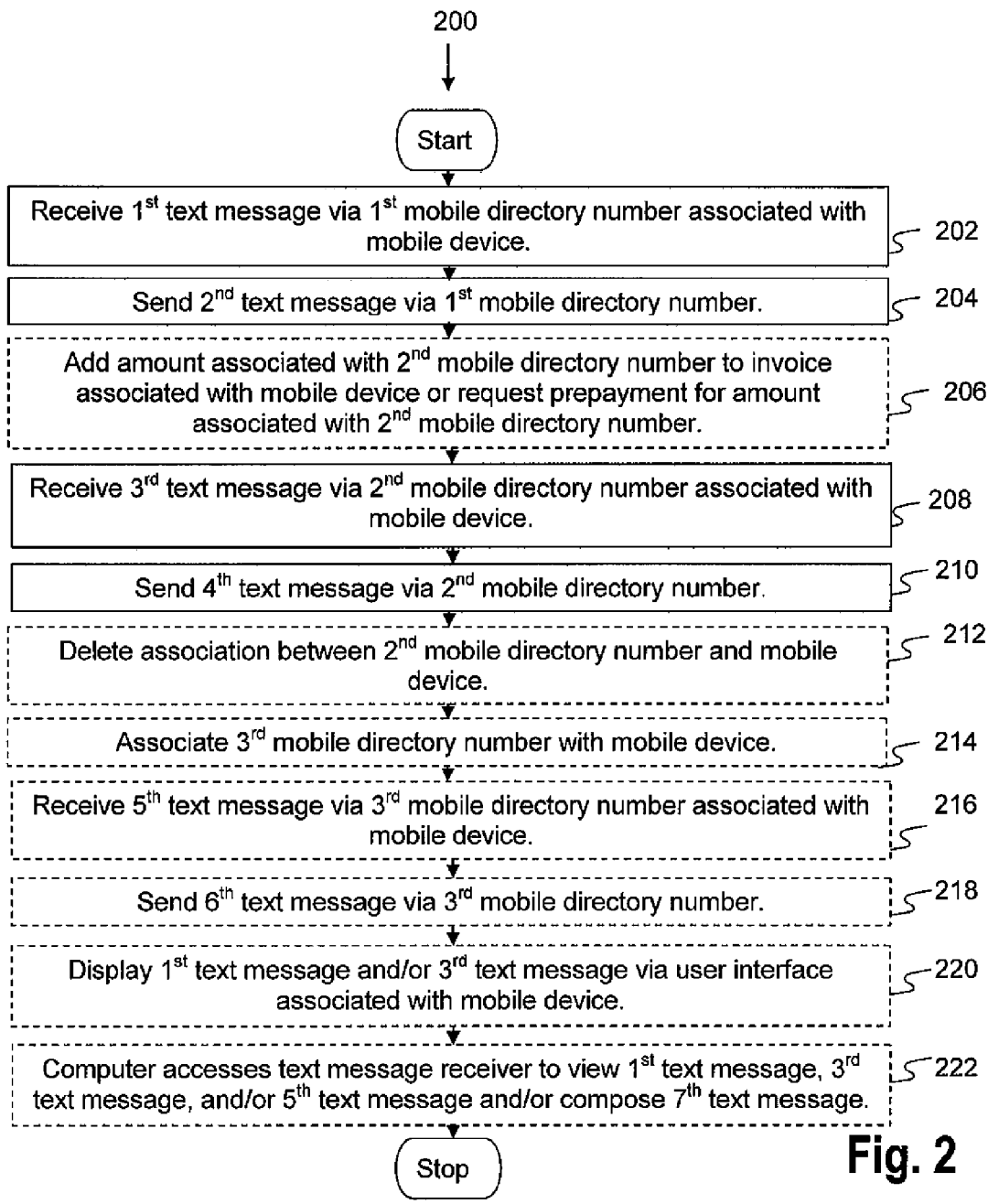
FIG. 2 is a flowchart of a method for mobile device alternative text messaging according to some embodiments of the present disclosure.

FIG. 2 is a flowchart of a method 200 for mobile device alternative text messaging according to some embodiments of the present disclosure. The system 100 can execute the method 200 to send and receive text messages using multiple mobile directory numbers associated with the first mobile device 102.

In box 202, a first text message is received via a first mobile directory number associated with a mobile device. For example, the server messaging component 128 routes the supervisor's text message sent to the woman's primary mobile directory number from the supervisor's mobile device 104 to the woman's mobile device 102, and the mobile messaging component 126 receives the supervisor's text message.

In box 204, a second text message is sent via a first mobile directory number. For example, the mobile messaging component 126 sends the woman's text message response to the supervisor's text message using her primary mobile directory number, and the server messaging component 128 routes her response to the supervisor's text message to the supervisor's mobile device 104.

In box 206, an amount associated with a second mobile directory number is optionally added to an invoice associated with a mobile device or prepayment is optionally requested for the amount associated with the second mobile directory number. For example, the server messaging component 128 adds an amount associated with the woman's auxiliary mobile directory number to her monthly invoice associated with her mobile device 102.

In box 208, a third text message is received via a second mobile directory number associated with a mobile device. For example, the server messaging component 128 routes the man's text message sent to the woman's auxiliary mobile directory number from the man's mobile device 106 to the woman's mobile device 102, and the mobile messaging component 126 receives the man's text message.

In box 210, a fourth text message is sent via a second mobile directory number. For example, the mobile messaging component 126 sends the woman's text message response to the man's text message using her current auxiliary mobile directory number, and the server messaging component 128 routes her response to the man's text message to the man's mobile device 106.

In box 212, an association is optionally deleted between a second mobile directory number and a mobile device. For example, the mobile messaging component 126 deletes the association between the woman's current auxiliary mobile directory number and her mobile device 102 because she is not interested in the man any more and he continues to send text messages to her at her current auxiliary mobile directory number.

In box 214, a third mobile directory number is optionally associated with a mobile device. For example, the mobile messaging component 126 associates the woman's new auxiliary mobile directory number with her mobile device 102 because she is interested in continuing her political text messages anonymously.

In box 216, a fifth text message is optionally received via a third mobile directory number associated with a mobile device. For example, the server messaging component 128 routes the political text message sent to the woman's auxiliary mobile directory number to the woman's mobile device 102, and the mobile messaging component 126 receives the political text message.

In box 218, a sixth text message is optionally sent via a third mobile directory number. For example, the mobile messaging component 126 the woman's text message response to the political text message using her new auxiliary mobile directory number, and the server messaging component 128 routes her response to the political text message to the communication device that sent the political text message.

In box 220, a first text message and/or a third text message is optionally displayed via a user interface associated with a mobile device. For example, the mobile messaging component 126 displays the supervisor's text message via the user interface 124.

In box 222, a computer optionally accesses a text message receiver to view a first text message, a third text message, and/or a fifth text message and/or compose a seventh text message. For example, the computer 116 accesses the text message mailbox for the new auxiliary mobile directory number via a short code service to view the political text message, and to compose another text message response to the political text message.

Figure 3:
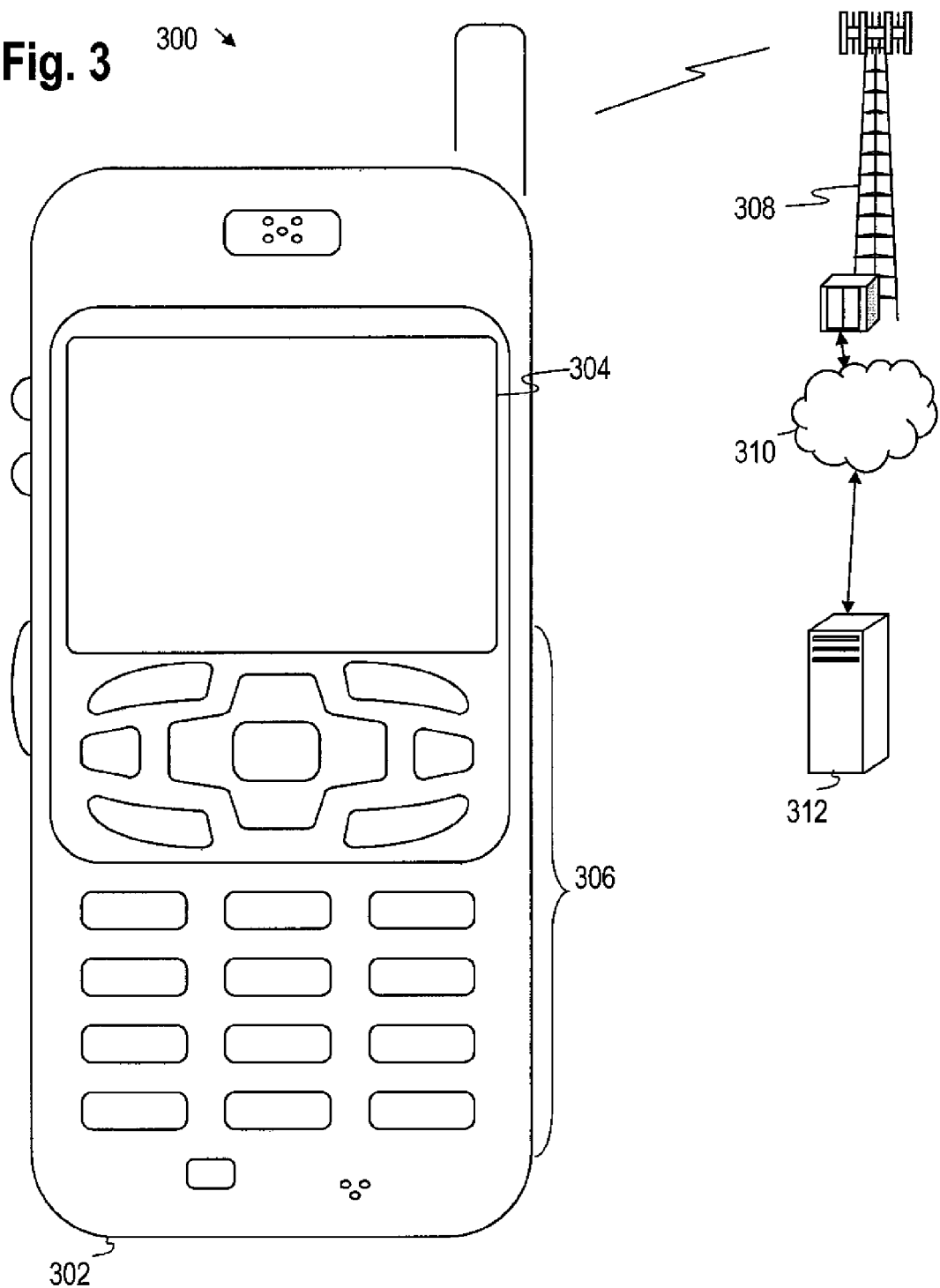
FIG. 3 shows an illustrative wireless communications system according to some embodiments of the present disclosure.

FIG. 3 shows a wireless communications system 300 including a mobile device 302. In an embodiment, the mobile device devices 102-106 may be implemented as the mobile device 302. FIG. 3 depicts the mobile device 302, which is operable for implementing aspects of the present disclosure, but the present disclosure should not be limited to these implementations. Though illustrated as a mobile phone, the mobile device 302 may take various forms including a wireless mobile device, a pager, a personal digital assistant (PDA), a gaming device, an inventory control device, a media player, a digital camera, a digital calculator, a telephone, a wireless communication device, a portable computer, a digital music player, and an electronic key fob for keyless entry. Many suitable mobile devices 302 combine some or all of these functions. In some embodiments of the present disclosure, the mobile device 302 is not a general purpose computing device, but rather is a special-purpose communications device such as a mobile phone, wireless mobile device, pager, or PDA. The mobile device 302 may support specialized activities such as gaming, inventory control, job control, and/or task management functions, and so on.

The mobile device 302 includes the display 304 and a touch-sensitive surface or keys 306 for input by a user. The mobile device 302 may present options for the user to select, controls for the user to actuate, and/or cursors or other indicators for the user to direct. The mobile device 302 may further accept data entry from the user, including numbers to dial or various parameter values for configuring the operation of the mobile device 302. The mobile device 302 may further execute one or more software or firmware applications in response to user commands. These applications may configure the mobile device 302 to perform various customized functions in response to user interaction. Additionally, the mobile device 302 may be programmed and/or configured over-the-air, for example from a wireless base station, a wireless access point, or a peer mobile device 302.

The mobile device 302 may execute a web browser application which enables the display 302 to show a web page. The web page may be obtained via wireless communications with a base transceiver station 308, a wireless network access node, a peer mobile device 302 or any other wireless communication network or system. The base transceiver stations 108-110 may be implemented as the base transceiver station 308. While a single base transceiver station 308 is illustrated, it is understood that the wireless communication system may comprise additional base transceiver stations 308. In some instances, the mobile device 302 may be in communication with multiple base transceiver stations 308 at the same time. The base transceiver station 308 (or wireless network access node) is coupled to the network 310, which may be the network 112. Via the wireless link and the network 310, the mobile device 302 has access to information on various servers, such as the server 312, which may be the communication server 114. The server 312 may provide content that may be shown on the display 304. Alternately, the mobile device 302 may access the base transceiver station 308 through a peer mobile device 302 acting as an intermediary, in a relay type or hop type of connection.

Figure 4:
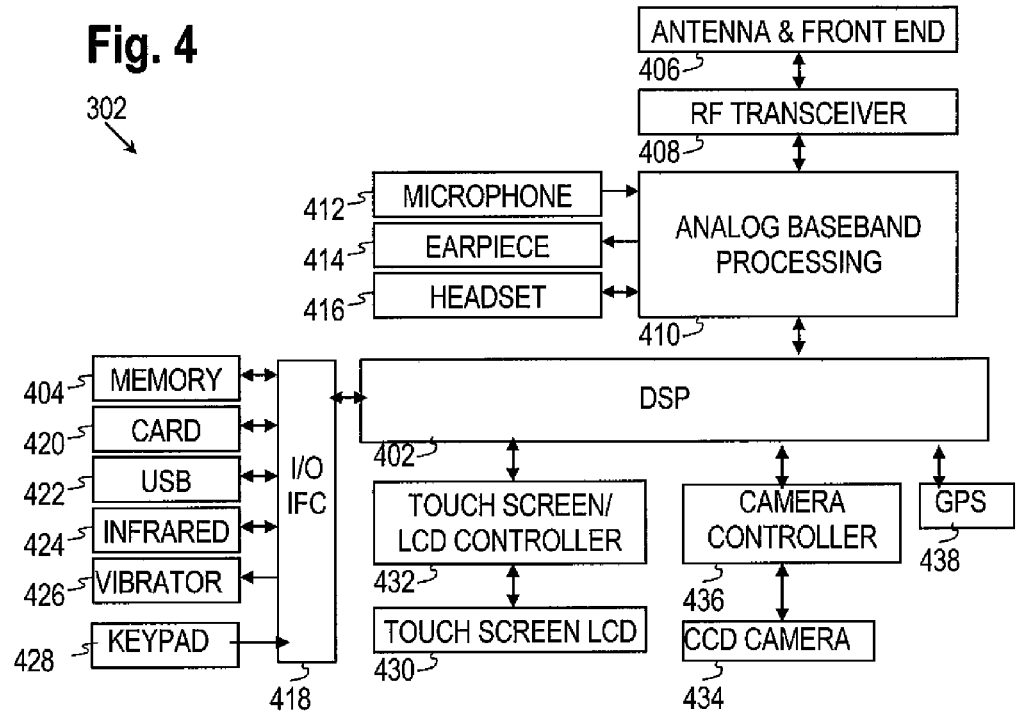
FIG. 4 is a block diagram of an illustrative mobile device according to some embodiments of the present disclosure.

FIG. 4 is a block diagram of the mobile device 302. While a variety of known components of the mobile device 302 are depicted, in an embodiment a subset of the listed components and/or additional components not listed may be included in the mobile device 302. The mobile device 302 includes a digital signal processor (DSP) 402 and a memory 404. As shown, the mobile device 302 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the mobile device 302 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the mobile device 302 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the mobile device 302 to send and receive information from a radio access network (RAN) or some other available wireless communications network or from a peer mobile device 302. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset port 416 and outputs to the earpiece speaker 414 and the headset port 416. To that end, the analog baseband processing unit 410 may have ports for connecting to the built-in microphone 412 and the earpiece speaker 414 that enable the mobile device 302 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the mobile device 302 to function as a peripheral device to exchange information with a personal computer or other computer system. The infrared port 424 and other optional ports such as a Bluetooth interface or an IEEE 802.11 compliant wireless interface may enable the mobile device 302 to communicate wirelessly with other nearby mobile devices 102 and/or wireless base stations.

The input/output interface 418 may further connect the DSP 402 to the vibrator 426 that, when triggered, causes the mobile device 302 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the mobile device 102. Another input mechanism may be the touch screen LCD 430, which may also display text and/or graphics to the user. The touch screen LCD controller 432 couples the DSP 402 to the touch screen LCD 430.

The CCD camera 434 enables the mobile device 302 to take digital pictures. The DSP 402 communicates with the CCD camera 434 via the camera controller 436. The GPS sensor 438 is coupled to the DSP 402 to decode global positioning system signals, thereby enabling the mobile device 302 to determine its position. In another embodiment, a camera operating according to a technology other than charge coupled device cameras may be employed. Various other peripherals may also be included to provide additional functions, e.g., radio and television reception.

Figure 5:
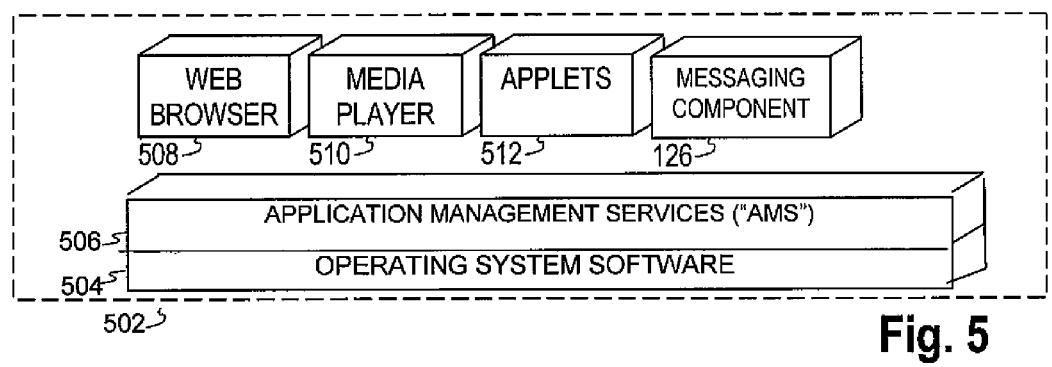
FIG. 5 is a block diagram of an illustrative software configuration for a mobile device according to some embodiments of the present disclosure.

FIG. 5 illustrates a software environment 502 that may be implemented by the DSP 402. The DSP 402 executes operating system drivers 504 that provide a platform from which the rest of the software operates. The operating system drivers 504 provide drivers for the mobile device hardware with standardized interfaces that are accessible to application software. The operating system drivers 504 include application management services ("AMS") 506 that transfer control between applications running on the mobile device 302. Also shown in FIG. 5 are a web browser application 508, a media player application 510, JAVA applets 512, and the mobile messaging component 126. The web browser application 508 configures the mobile device 302 to operate as a web browser, allowing a user to enter information into forms and select links to retrieve and view web pages. The media player application 510 configures the mobile device 302 to retrieve and play audio or audiovisual media. The JAVA applets 512 configure the mobile device 302 to provide games, utilities, and other functionality.

Figure 6:
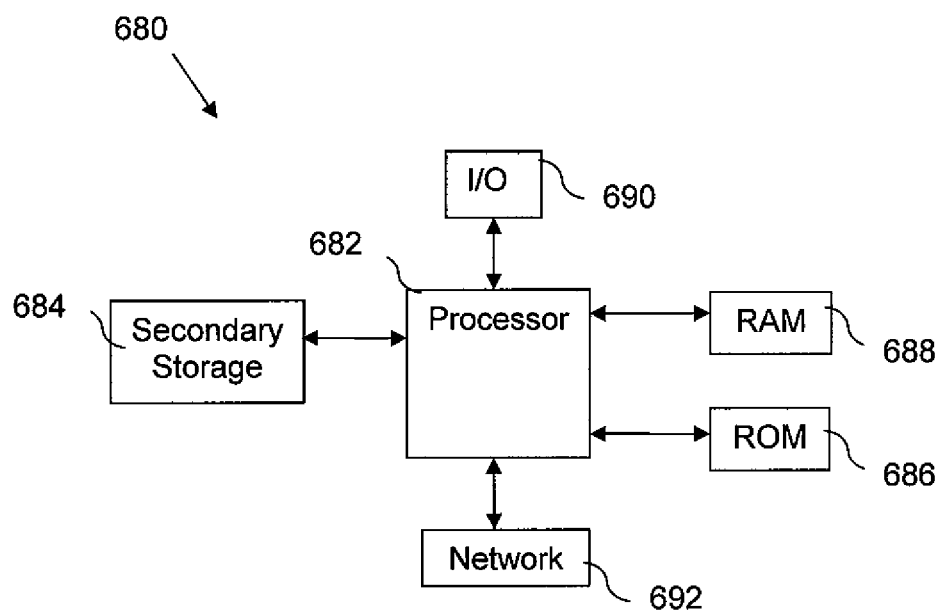
FIG. 6 shows an illustrative computer system suitable for implementing portions of the several embodiments of the present disclosure.

Some aspects of the system described above may be implemented on a computer with sufficient processing power, memory resources, and network throughput capability to handle the necessary workload placed upon it. FIG. 6 illustrates a typical computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the and scope disclosed herein.

What is claimed is:

1. A mobile device system for alternative text messaging, comprising:
    a processor on a mobile device, wherein the mobile device has a primary directory number and an auxiliary directory number associated with a single subscriber identity module;
    a transceiver for sending and receiving messages;
    a non-transitory memory on the mobile device; and
    a messaging component stored in the non-transitory memory, that upon execution by the processor, configures the processor to:
        receive a first text message sent by a first originator device to the primary directory number associated with the mobile device,
        send a first response text message from the mobile device to the first originator device via the primary directory number,
        receive a second text message sent by a second originator device to the auxiliary directory number associated with the mobile device, wherein the auxiliary directory number is a mobile phone number that is a ten digit number, a wireless service provider associated with the mobile device does not route voice calls to the auxiliary directory number and only routes text messages to the auxiliary directory number, and the auxiliary directory number is associated with only the single subscriber identity module of the mobile device,
        send a second response text message from the auxiliary directory number associated with the mobile device to the second originator device,
        disable receipt of subsequent text messages at the auxiliary directory number based on a deletion of the association between the auxiliary directory number and the mobile device,
        associate a second auxiliary directory number that is different than the auxiliary directory number with the mobile device, and
        send or receive a third text message via the second auxiliary directory number associated with the mobile device.

2. The mobile device system of claim 1, wherein the primary directory number comprises a ten digit number.

3. The mobile device system of claim 1, wherein the messaging component further displays at least one of the first text message and the second text message via a user interface associated with the mobile device.

4. The mobile device system of claim 3, wherein the user interface displays the first text message and the second text message via one text message folder or two text message folders.

5. The mobile device system of claim 4, wherein the one text message folder displays at least one of the primary directory number associated with the first text message and the auxiliary directory number associated with the second text message.

6. The mobile device system of claim 1, wherein a user interface displays the first text message and the second text message via a text message folder, and wherein the text message folder displays the primary directory number associated with the first text message and the auxiliary directory number associated with the second text message.

7. The mobile device system of claim 1, wherein the primary directory number is displayed in a field of the first text message and the auxiliary directory number is displayed in a field of the second text message, and wherein the messaging component uses the corresponding field to determine that the first response text message is to be sent from the primary directory number and the second response text message is to be sent from the auxiliary directory number.

8. A computer implemented method for mobile device alternative text messaging, comprising:
   receiving, by a messaging component stored in a non-transitory memory and executed by a processor, a first text message via a primary directory number associated with a mobile device, wherein the mobile device has the primary directory number and an auxiliary directory number associated with a single subscriber identity module,
   sending, by the messaging component, a first response text message from the mobile device via the primary directory number,
   receiving, by the messaging component, a second text message via the auxiliary directory number associated with the mobile device, wherein the auxiliary directory number is a mobile phone number that is a ten digit number, a wireless service provider associated with the mobile device does not route voice calls to the auxiliary directory number and only routes text messages to the auxiliary directory number, and the auxiliary directory number is associated with only the single subscriber identity module of the mobile device,
   sending, by the messaging component, a second response text message from the auxiliary directory number associated with the mobile device,
   disabling, by the message component, receipt of subsequent text messages at the auxiliary directory number based on a deletion of the association between the auxiliary directory number and the mobile device,
   associating, by the message component, a second auxiliary directory number that is different than the auxiliary directory number with the mobile device,
   receiving, by the messaging component, a third text message via the second auxiliary directory number associated with the mobile device, and
   sending, by the messaging component, a third response text message from the mobile device via the second auxiliary directory number.

9. The computer implemented method of claim 8, wherein the memory and the processor are located on at least one of a mobile device and a communication server.

10. The computer implemented method of claim 8, wherein at least one of receiving the first text message, sending the first response text message, receiving the second text message, and sending the second response text message comprises communicating a short message service (SMS) message via a mobile device wireless paging channel.

11. The computer implemented method of claim 8, further comprising one of adding an amount associated with the auxiliary directory number to an invoice associated with the mobile device and requesting prepayment for the amount associated with the auxiliary directory number.

12. The computer implemented method of claim 8, wherein sending at least one of the first response text message and the second response text message comprises communicating via a push-to-talk network in response to a determination that the mobile device is subscribed to the push-to-talk communication service.

13. The computer implemented method of claim 12, wherein the mobile device provides push-to-talk communication via a first technology network, a voice call is communicated via a second technology network, and wherein the first technology network and the second technology network comprise different technology networks.

14. The computer implemented method of claim 13, wherein the first technology network communicates via one of an integrated digital enhanced network (IDEN) communication technology and a code division multiple access (CDMA) technology, and wherein the second technology network communicates via one of a code division multiple access (CDMA) technology, a global system for mobile communication (GSM) technology, a universal mobile telecommunications system (UMTS) technology, a long-term evolution (LTE) technology, and a worldwide interoperability for microwave access (WiMAX) technology.

15. A mobile device system for alternative text messaging, comprising:
   a processor on a mobile device, wherein the mobile device has a primary directory number and an auxiliary directory number associated with a single subscriber identity module;
   a transceiver for sending and receiving messages;
   a non-transitory memory on the mobile device; and
   a messaging component, stored in the non-transitory memory, that upon execution by the processor, configures the processor to:
      receive a first text message via the primary directory number associated with the mobile device,
      send a first response text message from the mobile device via the primary directory number,
      receive a second text message via the auxiliary directory number associated with the mobile device, wherein the auxiliary directory number is a mobile phone number that is a ten digit number, a wireless service provider associated with the mobile device does not route voice calls to the auxiliary directory number and only routes text messages to the auxiliary directory number, and the auxiliary directory number is associated with only the single subscriber identity module of the mobile device,
      send a second response text message from the auxiliary directory number associated with the mobile device, disable receipt of subsequent text messages at the auxiliary directory number based on a deletion of the association between the auxiliary directory number and the mobile device, associate a second auxiliary directory number that is different than the auxiliary directory number with the mobile device, receive a third text message via the second auxiliary directory number associated with the mobile device, and send a third response text message from the mobile device via the second auxiliary directory number.

16. The mobile device system of claim 15, wherein the messaging component deletes the association between the auxiliary directory number and the mobile device based on an identification of the third text message as a spam text message.

17. The mobile device system of claim 15, wherein at least one of the first text message, the second text message, and the third text message is received from a short code service and at least one of the first response text message, the second response text message, and the third response text message is sent to the short code service.

18. The mobile device system of claim 15, wherein at least one of the first text message, the second text message, and the third text message is received via at least one of a short message service (SMS) message and a multimedia messaging service (MMS), and at least one of the first response text message, the second response text message, and the third response text message is sent via at least one of the short message service (SMS) message and the multimedia messaging service (MMS).

19. The mobile device system of claim 15, further comprising a computer that accesses a text message receiver to view at least one of the first text message, the second text message, and the third text message and compose a fourth text message.

* * * * *